United States Patent [19]
Harada et al.

[11] Patent Number: 5,047,650
[45] Date of Patent: Sep. 10, 1991

[54] MONOCHROMETER

[75] Inventors: Tatsuo Harada, Fuchu; Masaaki Ito, Hachioji; Toshiaki Kita, Tokyo, all of Japan

[73] Assignee: Hitachi, Ltd., Tokyo, Japan

[21] Appl. No.: 639,303

[22] PCT Filed: Nov. 14, 1984

[86] PCT No.: PCT/JP84/00545
§ 371 Date: Jul. 17, 1985
§ 102(e) Date: Jul. 17, 1985

[87] PCT Pub. No.: WO85/02254
PCT Pub. Date: May 23, 1985

Related U.S. Application Data

[63] Continuation of Ser. No. 188,642, May 2, 1988, which is a continuation of Ser. No. 70,637, Jul. 6, 1987, which is a continuation of Ser. No. 758,220, Jul. 17, 1985, abandoned.

[30] Foreign Application Priority Data

Nov. 21, 1983 [JP] Japan .................................. 58-217726

[51] Int. Cl.$^5$ ............................................... G21K 1/06
[52] U.S. Cl. ......................................... 250/505.1; 378/84
[58] Field of Search ........................ 250/505.1; 378/84

[56] References Cited

U.S. PATENT DOCUMENTS

| 3,344,274 | 9/1967 | Ashby et al. | 378/81 |
| 4,429,411 | 1/1984 | Smither | 378/84 |
| 4,553,253 | 11/1985 | Petersen | 378/84 |

FOREIGN PATENT DOCUMENTS 57-149926 9/1982 Japan .

Primary Examiner—Jack I. Berman
Attorney, Agent, or Firm—Antonelli, Terry, Stout & Kraus

[57] ABSTRACT

The invention relates to a monochrometer which disperses the light containing many wavelengths emitted from a source of light, and which takes out a given wavelength component only. The invention realizes a monochrometer which can take out the light of a single wavelength maintaining a very high wavelength purity by using a plane grating C which can be easily manufactured maintaining a high precision and by employing a very simply constructed wavelength sweeping mechanism in which the distance between the incident slit A and the diffraction grating C as well as the distance between the exit slit B and the diffraction grating C are maintained constant, instead of using a concave grating that had been indispensable in the conventional monochrometer adapted to the wavelength regions of from soft X-rays to vacuum ultraviolet rays.

3 Claims, 4 Drawing Sheets $\lambda = 5 \text{ Å}$ $\lambda = 10 \text{ Å}$ $\lambda = 50 \text{ Å}$ $\lambda = 100 \text{ Å}$

MONOCHROMETER

This application is a continuation application of Ser. No. 188,642, filed May 2, 1988 which is a continuation of application Ser. No. 070,637, filed Jul. 6, 1987 which is a continuation of Ser. No. 758,220, filed Jul. 17, 1985 now abandoned.

TECHNICAL FIELD

The present invention relates to a monochrometer which disperses the multi-wavelength light emitted from a source of light, and which takes out only a given wavelength component. In particular, the invention is related to a plane grating monochrometer which is adapted to the radiation light ranging from soft X-rays through up to vacuum ultraviolet rays.

BACKGROUND ART

Generally, a concave grating monochrometer has heretofore been used to disperse the radiation light having wavelengths of from about 5 angstroms to about 2000 angstroms over the range of soft X-rays through up to vacuum ultraviolet regions, and to take out a given wavelength component. This is because, in these wavelength regions, the light is reflected poorly by the surface of metal and, besides, a suitable lens material is not available. Therefore, it is difficult to use the plane grating which necessitates an auxiliary optical system for collimation or for focusing the light. The concave grating having both the dispersion power of the plane grating and the focusing power of the concave mirror, therefore, is effective for dispersing the light over these wavelength regions.

However, in the conventional concave grating that had hitherto been used from the 1880s up to the present time, constant spacing and straight grooves are engraved in the concave spherical surface. Therefore, due to the limitation in the arrangement of grooves in the grating, the spectral image obtained by the spectrometer inevitably contains much aberration. With the concave grating monochrometer, therefore, there is obtained a single wavelength component having a low wavelength purity, and the spectral efficiency is low.

In order to solve such problems, a system has recently been proposed according to which the grooves of the concave grating are arranged in a varied spacing and curved manner, and the distance among the grooves of the grating and the curvature of grooves are selected depending upon the wavelength regions of the spectrometer or the arrangement of the optical system, such that the aberration, that was not avoidable with the conventional concave grating, can be removed or greatly reduced (see M. C. Hutley, Diffraction Gratings, Academic Press, 1982, p. 232; Japanese Patent Publication No. 33562/1982).

Such a so-called aberration corrected concave grating can be prepared by either the mechanical ruling or by the so-called holographic method in which interference fringes by a laser beam are photographically processed, to arrange the grooves in the grating maintaining a very high precision. In this case, however, if there exists error in the shape of a concave spherical surface that serves as a grating substrate, there develops aberration in the spectral image to a degree equivalent to the error in the grating groove arrangement.

Generally, it is difficult to prepare a spherical surface that works as a concave grating substrate compared with a plane. In forming a spherical surface having a desired curvature, in particular, error is frequently involved in the radius of curvature and in the spherical surface. Therefore, despite the grooves are arranged in the grating in the same manner as the plane grating, the concave grating is not capable of exhibiting spectral imaging function to a degree which is comparable to that of the plane grating.

DISCLOSURE OF INVENTION

The present invention was accomplished under such circumstances, and its object is to provide a monochrometer which is simply constructed and which has a high dispersive power.

In order to achieve the above-mentioned object according to the present invention, a monochrometer is formed using a plane grating which exhibits both the light dispersing function and the focusing function based upon groove arrangement of varied spacing in the grating. Namely, the invention deals with a monochrometer comprising:

a plane grating having grooves of varied spacing, the spacing among the grooves being continuously changed depending upon the position of grooves, such that the light of a single wavelength emitted from a given point is reflected and diffracted by a diffraction grating and is converged at another given point on a plane perpendicular to the grooves of the grating;

a mechanism for turning said diffraction grating about an axis of rotation including the grooves thereof by a given angle; and a mechanism which arbitrarily changes the angle of deviation of a spectrometer which sees an incident slit and an exit slit from the axis of rotation of said diffraction grating on a plane perpendicular to the axis of rotation of said diffraction grating;

and wherein a given single wavelength component is taken, through said exit slit, out of the light beam which has passed through said incident slit and which is reflected and diffracted by said plane grating, by changing the angle of deviation of said spectrometer and the rotational angle of said diffraction grating while maintaining constant the distance between the axis of rotation of said diffraction grating and said incident slit and maintaining constant the distance between the axis of rotation of said diffraction grating and said exit slit.

BEST MODE FOR CARRYING OUT THE INVENTION

First, the fundamental principle of the present invention will be explained below.

Figure 1:
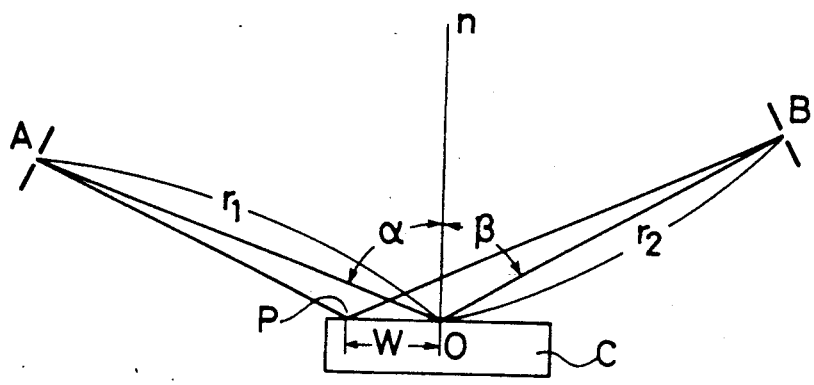
FIG. 1 is a diagram of arrangement for illustrating a fundamental optical system of a monochrometer according to the present invention.

FIG. 1 is a diagram illustrating the arrangement of a fundamental optical system of a plane grating monochrometer of the present invention, i.e., a section view perpendicular to the grooves of the plane grating. In this section view, polar coordinates are established with the center O of the diffraction grating C as an origin, and a normal n to the surface of the diffraction grating as a reference. Here, symbol $r_1$ denotes a distance from the center O of the diffraction grating to an incident slit A, $r_2$ denotes a distance from the center O of the diffraction grating to an exit slit B, $\alpha$ denotes an incident angle with respect to the center O of the diffraction grating, and $\beta$ denotes a diffraction angle of an m-th diffracted light having a wavelength $\lambda$. In this case, if the groove spacing of the diffraction grating is denoted by $\sigma_O$ at the center O of the diffraction grating, there holds the following relation between the incident angle $\alpha$ and the diffraction angle $\beta$, $$m\lambda = \sigma_O(\sin\alpha + \sin\beta) \quad (1)$$

Here, if the grooves are arranged while continuously changing the groove spacing as a function of distance W from the center O in a manner that the groove spacing $\sigma_W$ at a given point P on the surface of the grating away by a distance W from the center O of the grating satisfies the following relation, $$\frac{m\lambda}{\sigma_W} = \sin\left(\tan^{-1}\frac{r_1\sin\alpha - W}{r_1\cos\alpha}\right) + \sin\left(\tan^{-1}\frac{r_2\sin\beta - W}{r_2\cos\beta}\right) \quad (2)$$

then, the plane grating enables the m-th diffracted light of a wavelength $\lambda$ emitted from a point A $(r_1, \alpha)$ to be converged at a point B $(r_2, \beta)$ without aberration on the plane described above.

With the grating monochrometer, the wavelength sweeping is continuously effected by rotating or moving an optical part such as diffraction grating, slit, or the like. In this case, the wavelength sweeping mechanism should be as simple as possible. Here, the distances between the diffraction grating and the slits, i.e., $r_1$ and $r_2$, are maintained constant.

Concerning the m-th diffracted light having a wavelength $\lambda'$ different from the wavelength $\lambda$, if the position of incident slit is denoted by A' $(r_1, \alpha')$, a diffraction angle $\beta'$ corresponding to the position $\beta'$ $(r_2, \beta')$ of the exit slit can be found from, $$m\lambda' = \sigma_0(\sin\alpha' + \sin\beta') \quad (3)$$

In this case, if the groove spacing $\sigma'_W$ at the point P away from the center of the grating by the distance W satisfies the following relation, $$\frac{m\lambda'}{\sigma_W} = \sin\left(\tan^{-1}\frac{r_1\sin\alpha' - W}{r_1\cos\alpha'}\right) + \sin\left(\tan^{-1}\frac{r_2\sin\beta' - W}{r_2\cos\beta'}\right) \quad (4)$$

the m-th diffracted light having the wavelength $\lambda'$ emitted from the point A' $(r_1, \alpha')$ converges at the point B' $(r_2, \beta')$ without aberration.

Here, if the groove spacing $\sigma_W$ and the groove spacing $\sigma'_W$ of the diffraction grating given by the equation (2) that converges the m-th diffracted light of the wavelength $\lambda$ without aberration, are equal for all distances W, then it is possible to perfectly converge the m-th diffracted light having a different incident angle $\alpha'$ and a different wavelength $\lambda'$ by using a plane grating that perfectly converges the m-th diffracted light having the incident angle $\alpha$ and the wavelength $\lambda$.

In practice, $\sigma'_W$ does not come into perfect agreement with $\sigma_W$ no matter how the incident angle $\alpha'$ is selected. However, by selecting an incident angle which minimizes the difference between $\sigma'_W$ and $\sigma_W$, i.e., which minimizes a value $|\sigma'_W - \sigma_W|$ max within a range of the width W of the grating, the diffracted light having the wavelength $\lambda'$ can be converted approximately by using a plane grating having grooves of varied spacing that satisfies the perfectly converging condition at the wavelength $\lambda$.

Accompanying the change in the incident angle, the difference $(\alpha' - \beta')$ between the incident angle and the diffraction angle also changes, i.e., the angle of deviation of the spectrometer also changes. It is therefore necessary to set a predetermined incident angle $\alpha'$ and an angle of deviation $\alpha' - \beta'$ by turning either the incident slit or the exit slit or both of them with the center of the grating as an axis of rotation.

Thus, it is possible to obtain a monochrometer which effects the wavelength sweeping while maintaining constant the distance between the incident slit and the diffraction grating and maintaining constant the distance between the exit slit and the diffraction grating, by using a plane grating having a varied groove spacing, i.e., having the groove spacing $\sigma_W$ that satisfies the relation of equation (2) to perfectly converge the diffracted light of wavelength $\lambda$, by selecting the incident angle $\alpha'$ which makes the groove spacing $\sigma'_W$ for perfect converging of the equation (4) closest to $\sigma_W$ for all wavelengths $\lambda'$ over the utilizable wavelength region, i.e., which makes the value $|\sigma'_W - \sigma_W|$ max minimum, and by setting the angle of deviation $\alpha' - \beta'$ of the spectrometer from the diffraction angle $\beta'$ obtained from the equation (3).

The invention will be described below in further detail by way of an embodiment where the monochrometer is applied to the synchrotron radiation light.

The synchrotron radiation light contains a series of wavelengths ranging from X-rays through up to rays of visible ranges. To use the radiation light for a variety of measurements and processings, it is necessary to use a monochrometer to take out a single wavelength component out of the series of wavelengths.

Generally, the synchrotron radiation light is radiated from an oblong source of light which stretches in a horizontal direction and which has a narrow width, at a divergence angle of as narrow as from several milliradians to several tens of milliradians. From the side of the monochrometer for synchrotron radiation light, therefore, the source of light can be regarded as a horizontally arranged incident slit.

According to this embodiment, the source of light is regarded as the incident slit, the distance $r_1$ from the center of the incident slit to the center of the diffraction grating is selected to be, for example, 30 meters, and a distance from the center of the diffraction grating to the exit slit, i.e., the focal distance $r_2$ is selected to be, for example, one meter. If the groove spacing $\sigma_0$ at the center of the diffraction grating is 1/2400 mm, the groove spacing $\sigma_W$ of the plane grating which converges the primary diffracted light of an incident angle of 89° and a wavelength of 5 angstroms onto the exit slit, can be calculated from the equations (1) and (2) as shown in FIG. 2.

Figure 3:
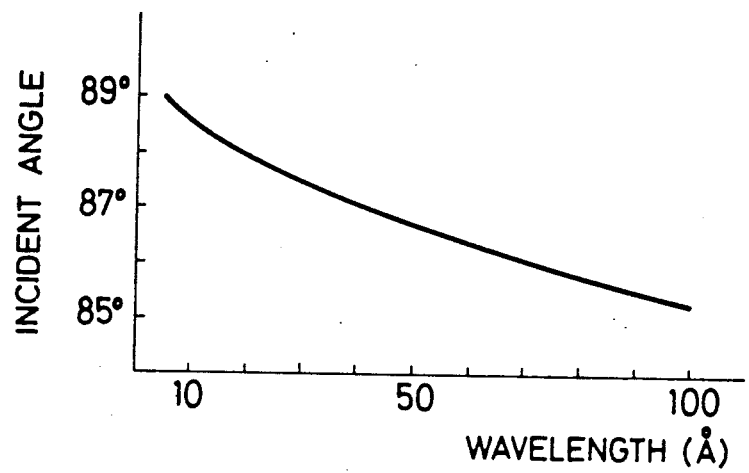
FIG. 3 is a diagram of a characteristic curve showing the change in the incident light upon the diffraction grating.

By using the diffraction grating, the incident angle $\alpha'$ is found as shown in FIG. 3 to make the groove spacing $\sigma_W$ for perfectly converging the diffracted light of the equation (4) closest to $\sigma_W$, i.e., to minimize the value $|\sigma_W - \sigma_W|$ max for the lights of wavelengths ranging from 5 angstroms to 100 angstroms. In this case, the angle of deviation $\alpha' - \beta'$ of the spectrometer becomes as shown in FIG. 4.

Figure 5A:
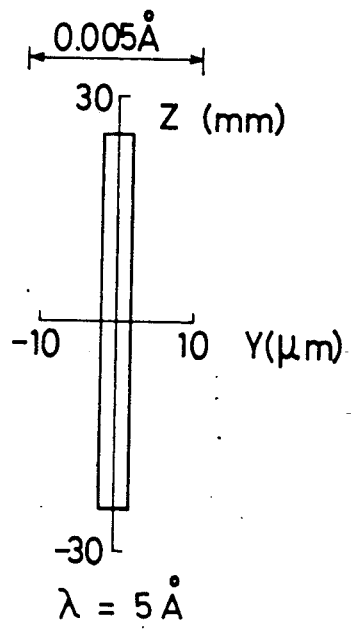
FIGS. 5(a) to 5(d) are diagrams showing the expansion of spectral image.
Figure 5B:
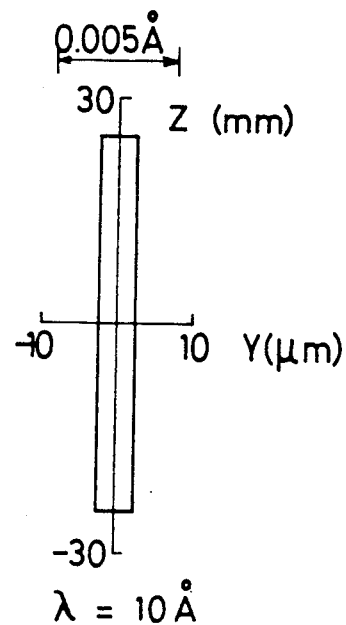
Figure 5C:
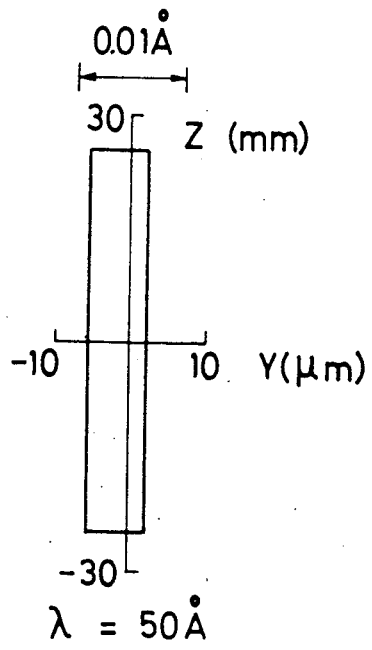
Figure 5D:
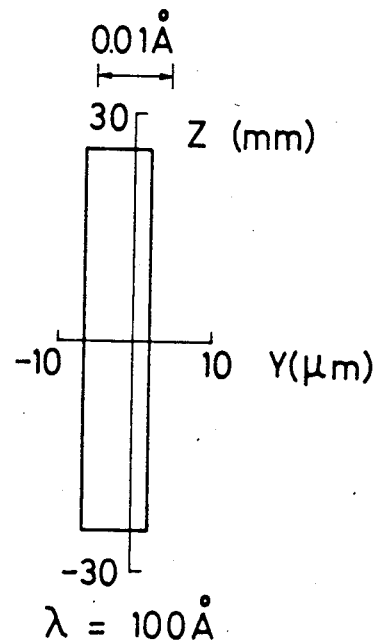

FIGS. 5(a) to 5(d) show the expansion of monochromatic lights having a wavelength of 5 angstroms (FIG. 5(a)), a wavelength of 10 angstroms (FIG. 5(b)), a wavelength of 50 angstroms (FIG. 5(c)) and a wavelength of 100 angstroms (FIG. 5(d)) that are obtained by the ray tracing method on the exit slit using the monochrometer of the present invention from the synchrotron radiation light that is emitted from the source of light measuring 3 mm in the horizontal direction and 0.3 mm in the vertical direction, that has an incident angle of 89° and that has a divergence angle (1.6 milliradians in the horizontal direction, and 0.12 milliradians in the vertical direction) which is sufficient to fall on the whole surface of the diffraction grating having a width of 200 mm and a groove length of 50 mm. In the drawings, the Y-axis and the Z-axis represent the direction of width of the exit slit (direction of the wavelength) and the direction of length thereof. The spectral imaging performance obtained here is superior to that of the conventional concave grating spectrometer having an auxiliary optical system for correcting aberration (disclosed, for instance, in Nucl. Instr. and Meth., by T. Namioka et al., 208, 1983, p. 215). Despite of its simply constructed optical system, therefore, the monochrometer of the present invention exhibits a very high converging performance for all of the wavelengths.

Figure 2:
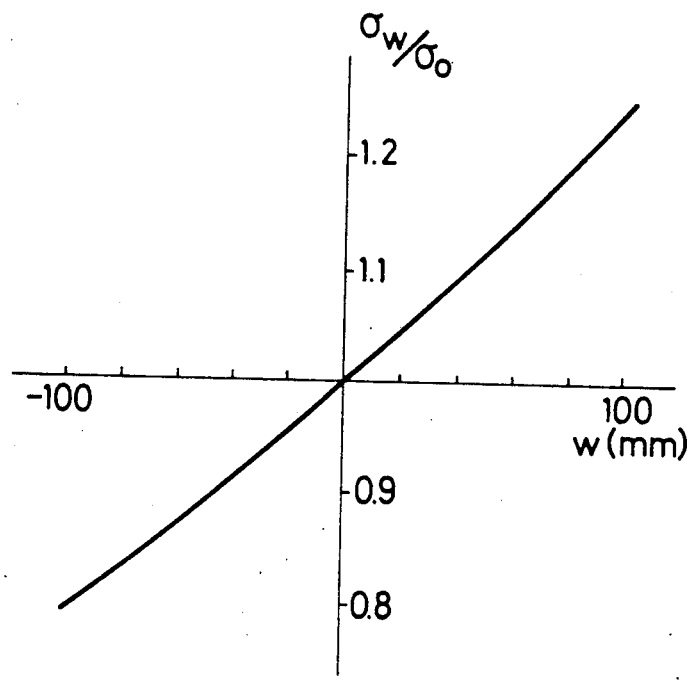
FIG. 2 is a diagram of a characteristic curve illustrating the change in the groove spacing in a plane grating according to the present invention.
Figure 4:
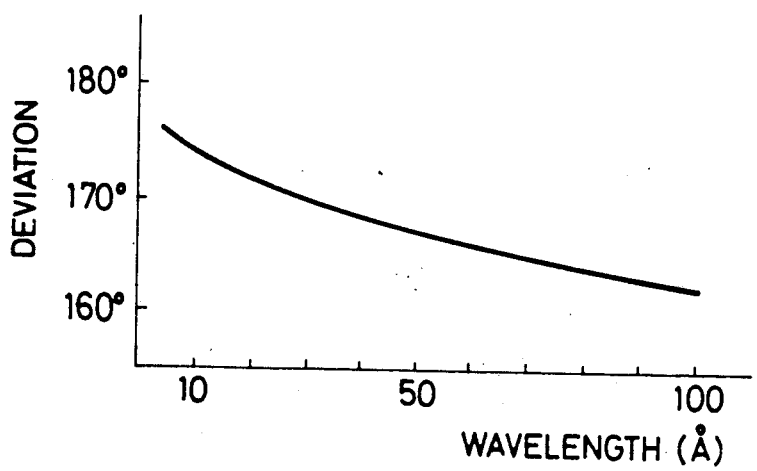
FIG. 4 is a diagram of a characteristic curve showing the change in the angle of deviation of the spectrometer.

Thus, there is obtained a monochrometer which is capable of taking out a monochromatic light having a very high wavelength purity over a wavelength region of from 5 angstroms to 100 angstroms, by using the plane grating having a varied groove spacing as shown in FIG. 2 that can perfectly converge the primary diffracted light of a wavelength of 5 angstroms, by turning the diffraction grating with respect to the incident light as shown in FIG. 3, and by turning the exit slit that satisfies the angle of deviation of spectrometer as shown in FIG. 4.

In the monochrometer for synchrotron radiation light, a spectrometer must be constituted in a vacuum vessel, and the position of exit slit and the direction of exit light should desirably be maintained constant irrespective of the wavelengths in order to introduce the exit monochromatic light to each of the devices.

Figure 6:
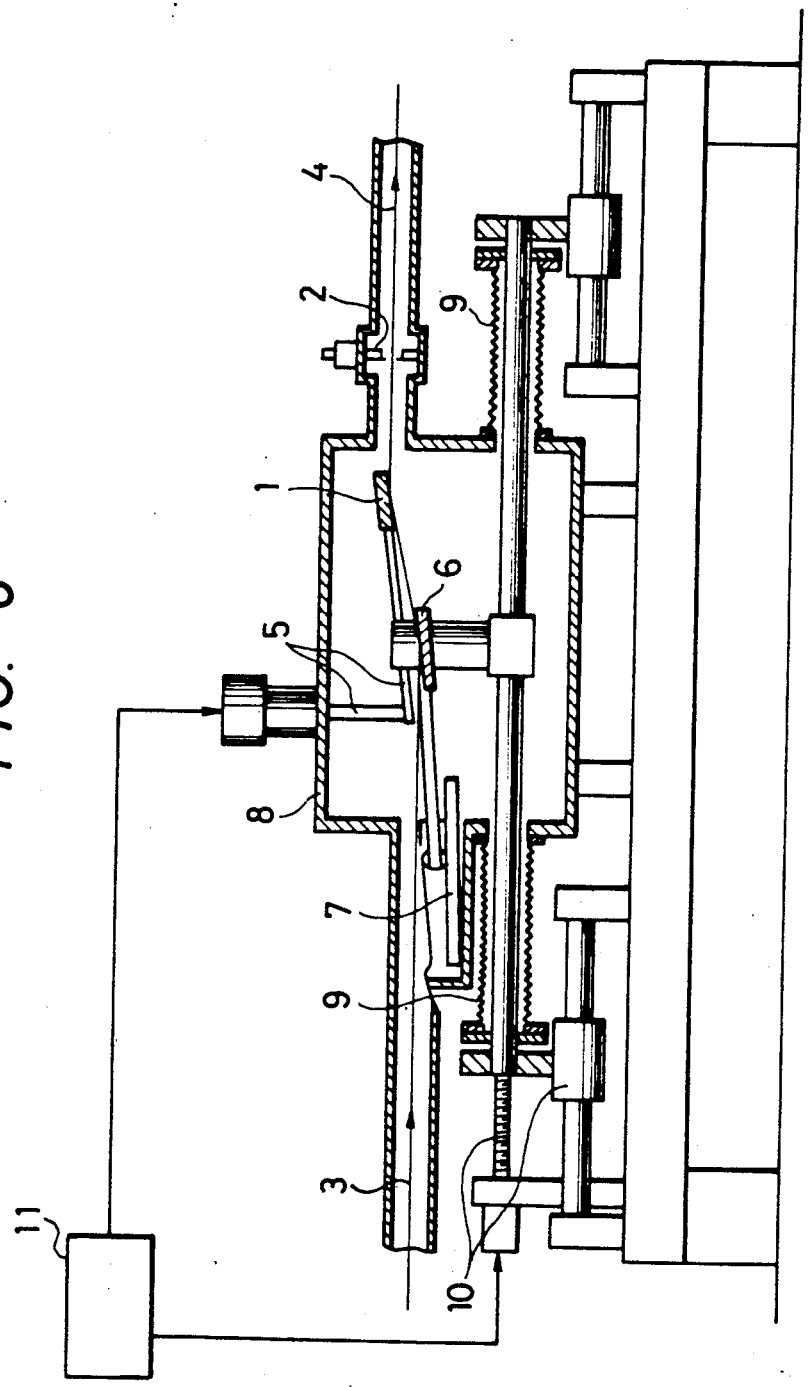
FIG. 6 is a diagram illustrating a mechanism for sweeping the wavelengths and an optical system according to an embodimetn of the present invention.

FIG. 6 illustrates a concrete construction which simultaneously satisfies the above requirements. Here, the direction of incident light 3, center of rotation of the plane grating 1, the exit slit 2, and the direction of exit light 4 are secured. The plane grating 1 has grooves of varied spacing as shown in FIG. 2, and can be arbitrarily turned by a grating turn mechanism 5. A plane mirror 6 is used to obtain a predetermined angle of deviation of spectrometer, and is turned being guided by a plane mirror turn guide 7 to move in parallel with the incident light 3. That is, the plane mirror 6 turns and proceeds straight so that the optical axis of the incident light is directed to the center of the diffraction grating at all times. Further, the plane mirror 6 is driven from the outside of the vacuum vessel 8 by a plane mirror moving mechanism 10 via a bellows 9. Rotational angle of the diffraction grating and the position of the plane mirror are controlled by a control circuit 11 for each of the wavelengths so that the incident angle and the angle of deviation of the spectrometer are obtained as shown in FIGS. 3 and 4.

In the above-mentioned embodiment, the monochrometer is applied to the wavelength region of soft X-rays in the synchrotron radiation light, and the source of light is regarded as the incident slit. However, the monochrometer of the present invention may be provided with an incident slit, as a matter of course, to treat general sources of visible rays, ultraviolet rays and vacuum ultraviolet rays.

According to the present invention as described in detail in the foregoing, it is made possible to realize a monochrometer which can take out the light of a single wavelength maintaining a very high wavelength purity by using a plane grating which can be easily manufactured maintaining a high precision and by employing a very simply constructed wavelength sweeping mechanism in which the distance between the incident slit and the diffraction grating as well as the distance between the exit slit and the diffraction grating are maintained constant, instead of using a concave grating that had been indispensable in the conventional monochrometer adapted to the wavelength regions of from soft X-rays to vacuum ultraviolet rays.

INDUSTRIAL APPLICABILITY

The monochrometer of the present invention can be effectively utilized for a variety of measurements, and is particularly adapted to radiation light ranging from soft X-rays through up to vacuum ultraviolet rays, such as of synchrotron radiation light.

What is claimed is:

1. A monochrometer comprising:
a plane diffraction grating having grooves of varied spacing, the spacing among the grooves being continuously changed depending upon the position of grooves, such that the light of a single wavelength emitted from a given point is reflected and diffracted by said plane diffraction grating and is converged at another point on a plane perpendicular to the grooves of said plane diffraction grating; said plane diffraction grating having grooves of varied spacing which continuously change as a function of distance W from a center 0 of said grating in a manner that the groove spacing $\sigma_W$ at a predetermined point P on the surface of the grating at a distance W from the center 0 of said grating satisfies the following relation:

$$\frac{m\lambda}{\sigma_W} = \sin\left(\tan^{-1}\frac{r_1 \sin\alpha - W}{r_1 \cos\alpha}\right) + \sin\left(\tan^{-1}\frac{r_2 \sin\beta - W}{r_2 \cos\beta}\right)$$

so that said plane grating enables m-th diffracted light of wavelength $\lambda$ emitted from said incident slit at a distance $r_1$ and angle $\alpha$ from the center 0 to be converted at said exit slit at a distance $r_2$ and an angle $\beta$ from the center $0$ without aberration;

a plane mirror for directing a light beam to said plane diffraction grating;

an incident slit for introducing the light beam; a fixed exit slit for directly taking out a light beam which is reflected and diffracted by said plane diffraction grating;

first means for turning said plane diffraction grating about an axis of rotation including the grooves thereof by a given angle; and second means for moving said plane mirror and for arbitrarily changing the angle of deviation of a spectrometer which sees said incident slit on said exit slit from the axis of rotation of said plane diffraction grating on a plane perpendicular to the axis of rotation of said plane diffraction grating; and control means for controlling said first and second means so that a given single wavelength component is taken, through said exit slit, out of the light beam which has passed through said incident slit and which is reflected and diffracted by said plane diffraction grating, by changing the angle of deviation of said spectrometer and the rotational angle of said plane diffraction grating while maintaining constant the distance between the axis of rotation of said plane diffraction grating and said incident light and maintaining constant the distance between the axis of rotation of said plane diffraction grating and said exit slit.

2. A monochrometer according to claim 1, wherein said second means moves said plane mirror in parallel with the light beam and turns said plane mirror in accordance with the movement thereof so that the optical axis of the light beam is directed to said plane diffraction grating.

3. A monochrometer according to claim 2, wherein said second means comprises a plane mirror turn guide which mechanically turns said plane mirror in accordance with the position of said plane mirror.

* * * * *